(12) United States Patent
Hill, Sr.

(10) Patent No.: US 6,904,687 B1
(45) Date of Patent: Jun. 14, 2005

(54) EXTENDED REACH TREE MAINTENANCE APPARATUS

(76) Inventor: Donald C. Hill, Sr., 716 Sternermill Rd., Feasterville, PA (US) 19053

( * ) Notice: Subject to any disclaimer, the term of this patent is extended or adjusted under 35 U.S.C. 154(b) by 31 days.

(21) Appl. No.: 10/760,727

(22) Filed: Jan. 20, 2004

(51) Int. Cl.$^7$ .............................................. B27B 17/02
(52) U.S. Cl. ...................................... 30/296.1; 30/381
(58) Field of Search ........................... 30/166.3, 296.1, 30/381, 382; 144/24.13

(56) References Cited

U.S. PATENT DOCUMENTS

| | | |
|---|---|---|
| 3,657,813 A | 4/1972 | Knight |
| 3,731,380 A | 5/1973 | Mathiesen |
| 3,731,382 A | 5/1973 | Wroc |
| 3,949,817 A * | 4/1976 | Rice ............................ 173/170 |
| 4,207,675 A | 6/1980 | Causey et al. |
| 4,654,971 A * | 4/1987 | Fettes et al. ................... 30/383 |
| 4,760,646 A * | 8/1988 | Siegler ......................... 30/382 |
| 4,916,818 A * | 4/1990 | Panek .......................... 30/383 |
| 4,976,031 A * | 12/1990 | Miller ........................ 30/296.1 |
| 5,411,238 A | 5/1995 | Caron |
| D361,481 S | 8/1995 | Rees et al. |
| 5,787,536 A | 8/1998 | Pate |
| 5,787,590 A * | 8/1998 | D'Alessandro, Sr. ...... 30/296.1 |
| 5,826,341 A | 10/1998 | Massa |
| 5,884,403 A | 3/1999 | Rogers |
| 5,933,965 A | 8/1999 | Linden et al. |
| 6,272,755 B1 | 8/2001 | Mittlesteadt et al. |
| 6,488,511 B1 | 12/2002 | Stewart |
| 6,526,664 B2 | 3/2003 | Cech |

* cited by examiner

*Primary Examiner*—Hwei-Siu Payer
(74) *Attorney, Agent, or Firm*—Michael Crilly, Esq.

(57) ABSTRACT

The present invention is an extended reach tree maintenance apparatus. The invention is comprised of a lightweight electric chain saw, at least two hollow and stackable extensions poles, a bracket, several fasteners, and a wireless ON/OFF switch. The bracket is attached to a handgrip at one end of the lightweight chain saw and has a coupler fixed along its length that facilitates its secured yet removable attachment with one extension pole. At least three fasteners pass through the bracket and contact the chain saw securing the bracket to the chain saw. One fastener depresses the trigger switch of the chain saw in the ON position. The wireless receiver switch is electrically connected to the chain saw and remotely operable via a wireless transmitter. In other embodiments, the invention further comprises a switch electrically connected between the chain saw and the wireless ON/OFF switch and fastened to an extension pole. The switch communicates electrical power to the chain saw when extension poles are within a defined angular range of operation and interrupts power when angular orientation is otherwise.

13 Claims, 4 Drawing Sheets

EXTENDED REACH TREE MAINTENANCE APPARATUS

CROSS REFERENCE TO RELATED APPLICATIONS

None.

FEDERALLY SPONSORED RESEARCH OR DEVELOPMENT

None.

BACKGROUND OF THE INVENTION

1. Field of the Invention

The present invention generally relates to a remotely operable tool. Specifically, the invention is an extension pole system with an electric chain saw at one end and having features to improve both performance and safety of the apparatus.

2. Description of the Related Art

The related arts include a variety of extensible pole systems specifically suited to tree trimming. Rogers (U.S. Pat. No. 5,884,403) and Causey et al. (U.S. Pat. No. 4,207,675) describe and claim telescoping pole systems having an electrically powered trimming device attached thereto. Wroe (U.S. Pat. No. 3,731,382) describes and claims a telescoping pole system having a gas powered trimming device attached thereon. Mathiesen (U.S. Pat. No. 3,731,380) and Knight (U.S. Pat. No. 3,657,813) describe and claim pole systems having an electrically powered tree trimming device thereon. Pate (U.S. Pat. No. 5,787,536) describes and claims a pole system having a gas powered tree trimming device thereon. And, Cech (U.S. Pat. No. 6,526,664 B2), Mittlesteadt et al. (U.S. Pat. No. 6,272,755 B1), Linden et al. (U.S. Pat. No. 5,933,965), Massa (U.S. Pat. No. 5,826,341) and Rees et al. (U.S. Pat. No. D361,481) describe and claim telescoping pole systems having either a manually or an electrically operable pruning device.

The related arts do not adequately provide an extension pole system allowing an operator to trim the upper regions of larger trees. Furthermore, the related arts do not address the safety problems inherent to tree maintenance via powered trimmers attached to an extensible pole system.

For example, Rogers provides a band or strap allowing the trigger switch of a hand saw to be engaged in the ON position. This arrangement separates saw activation from its attachment to the extension pole system. The danger imposed specifically relates to the activation of the saw without adequate assurance that it is properly secured to the extension system.

In a further example, the related arts favor the attachment of a mechanical ON/OFF switch electrically connected to the saw and mechanically fastened to the pole at the end closest to the operator. This arrangement places the switch along the pole length where hand placement is most required to effectively control both extension pole system and saw in extended reach applications. The danger imposed is inadequate control over and placement of both extension poles and saw due to a restriction on the pole length available for hand placement.

In yet another example, the related arts allow the saw to function irrespective of the angular orientation of the extension pole system. The danger imposed specifically relates to the continued operation of the saw at angles indicative of inadequate control or a hazardous orientation of the pole system.

What is currently required is an extension pole system with electrically operable saw providing for the secured attachment of the saw to the extension pole system when saw trigger is locked in the ON position.

What is currently required is an extension pole system with electrically operable saw that removes the ON/OFF switch controlling saw function from the extension poles.

What is currently required is an extension pole system with electrically operable saw that terminates saw function when orientation is inconsistent with controlled use.

SUMMARY OF THE INVENTION

An object of the present invention is to provide a mechanical interlock system that insures proper attachment between saw and extension pole system when trigger is engaged on electrically powered chain saw.

A further object of the present invention is to provide a wirelessly controlled ON/OFF switch mechanically separate from electric chain saw and extension pole system.

A further object of the present invention is to provide a switch that automatically turns power ON and OFF based on the angular orientation of the extension pole system.

The present invention is comprised of a lightweight electric chain saw, at least two extensions poles, a bracket, at least three fasteners, and a wireless ON/OFF switch. The extension poles are cylindrically shaped elements both hollow and stackable. The u-shaped bracket engages the handgrip at one end of the chain saw. The bracket has a cylindrically shaped coupler fixed along its length facilitating its secured yet removable attachment with one extension pole so that poles are parallel to the cutting axis of the chain saw. At least three fasteners pass through the u-shaped bracket and contact the chain saw securing the u-shaped bracket to the saw. One fastener depresses the trigger switch on the saw in the ON position. The wireless ON/OFF switch is electrically connected to the chain saw so as to avoid its direct physical contact with the extension poles. The wireless ON/OFF switch is remotely operable via a wireless transmitter.

In alternate embodiments, the present invention includes a tilt switch electrically connected between the lightweight electric chain saw and the wireless ON/OFF switch. The switch is fastened to one of the extension poles. The switch communicates electrical power to the chain saw when the extension poles are within a defined angular range of operation and interrupts power when poles are oriented otherwise.

In other alternate embodiments of the present invention, the lightweight electric chain saw is a device that minimizes vibration during cutting. In yet other embodiments, extension poles may be composed of a lightweight metal, preferably aluminum, coated with a non-conductive paint or a non-conductive polymer. In still other embodiments, the fastener depressing the trigger switch in the ON position may be a positive lock pin, a detent ring pin, a detent clevis pin, or a ring pin.

Two advantages are offered by the present invention. The invention improves control over and placement of an electric chain saw at extended heights. The invention reduces hazards currently existing in the related arts.

BRIEF DESCRIPTION OF THE DRAWINGS

The invention will now be described in more detail, by way of example only, with reference to the accompanying drawings, in which.

REFERENCE NUMERALS

Figure 1:
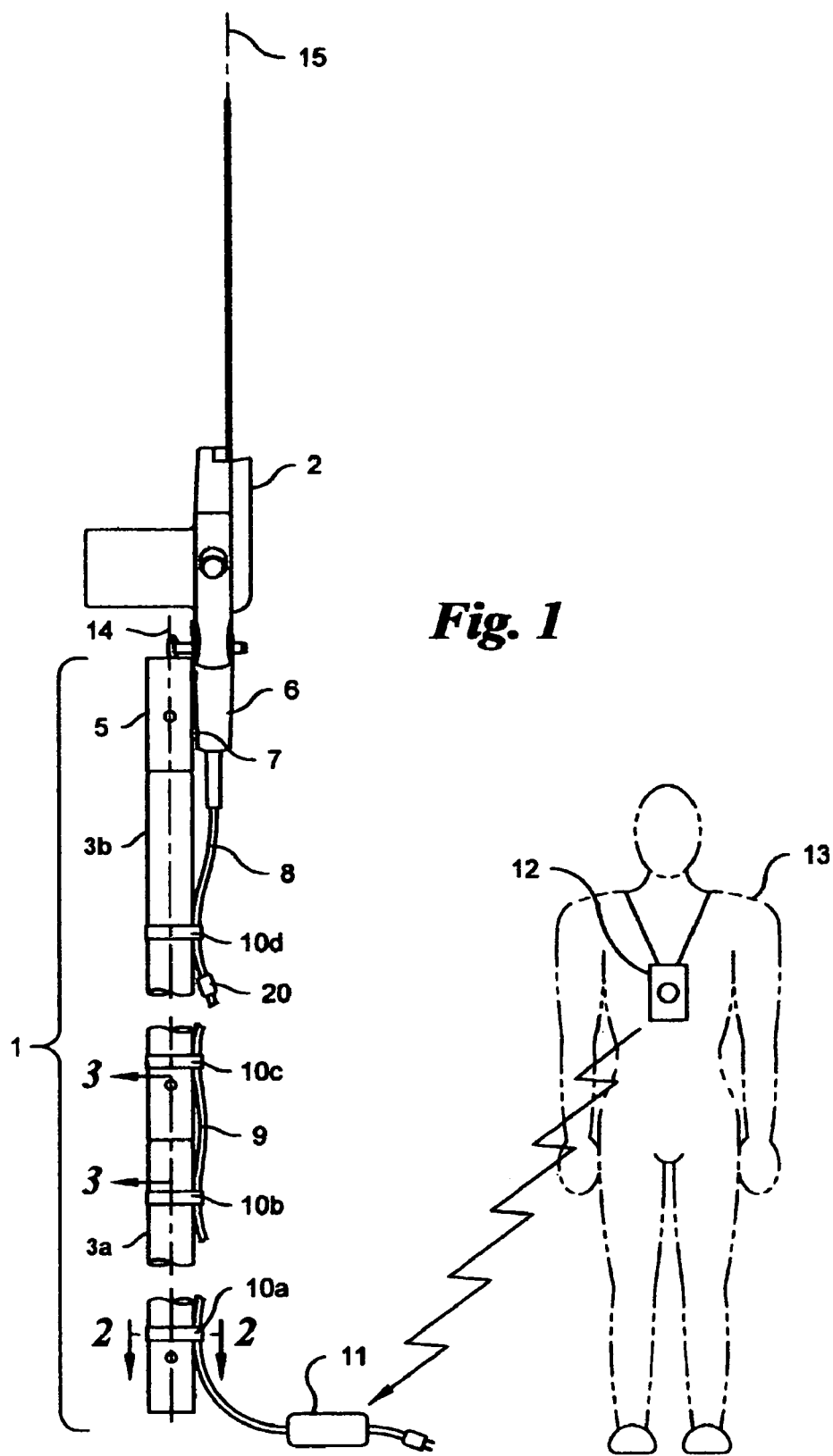
FIG. 1 is a top elevation view of the present invention showing extension pole system attached to a chain saw.

1 Extension pole system
2 Electric chain saw
3 Pole
4 Button
5 Coupler
6 Bracket
7 Weld seam
8 Power cord
9 Extension cord
10 Strap
11 Wireless ON/OFF switch
12 Wireless transmitter
13 Operator
14 Centerline
15 Cutting axis
16 Clip
17 Fastener
18 Trigger switch
19 Handgrip
20 Tilt switch

DESCRIPTION OF THE INVENTION

FIGS. 1–6 show and describe the present invention comprising an extension pole system 1, an electric chain saw 2, a bracket 6, at least three fasteners 17a–17c, a wireless ON/OFF switch 11, and an optional tilt switch 20.

Referring now to FIG. 1, the extension pole system 1 is comprised of at least two poles 3a, 3b coupled end-to-end in a stackable fashion to form a single member of linear extent. While various designs and materials are applicable to the poles 3a, 3b, preferred embodiments are hollow, tubular-shaped members. For example, commercially available aluminum bull float handles having a length of 6-feet and a diameter of 1.75-inches were both adequately stiff and lightweight to allow for the stacked arrangement and use of as many as six poles 3.

Figure 3:
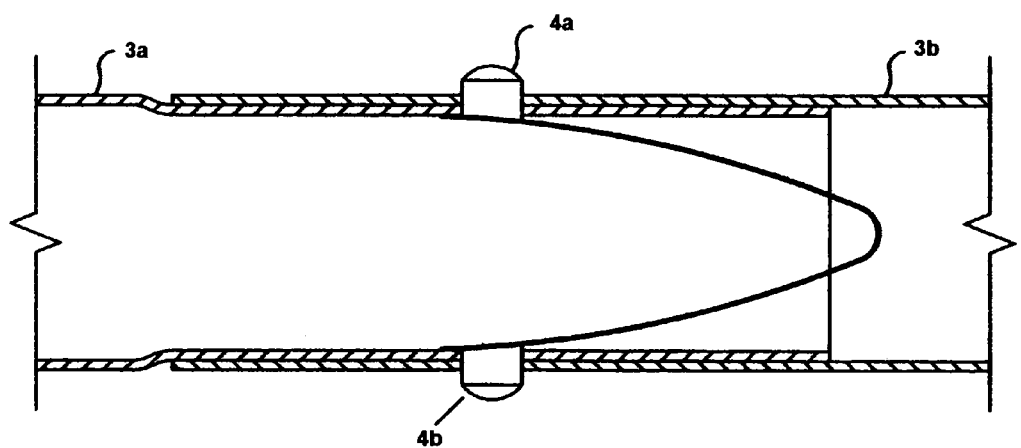
FIG. 3 is a section view of preferred coupling arrangement between two poles and between pole and coupler.

Referring now to FIG. 3, an exemplary interlock arrangement is shown between two poles 3a and 3b. In the described arrangement, the outer diameter of one pole 3a is smaller, along a length adjacent to its one end, than the inner diameter of another pole 3b to effect a sliding interconnection. A clip having two buttons 4a, 4b passing through and movable within mutually aligned holes along both poles 3a, 3b, also shown in FIG. 3, secures the poles 3a, 3b in a locked tandem arrangement. The clip 16 is made of a metal and shaped so as to allow for its compression and expansion in a spring-like fashion. Buttons 4a, 4b are depressed when separation of the poles 3a, 3b is desired so as to compress the clip 16 allowing the buttons 4a, 4b to pass through and completely free of the holes along the outermost pole 3b.

In some applications, it was preferred to have poles 3 coated with a non-conductive paint or polymer material to resist weather-related effects, as well as to prevent electricity from reaching the operator 13 after accidental contact with a power line. It is desired that the exterior coating have a visually distinctive color, non-limiting examples including yellow and red, so as to aid visual tracking of the extension pole system 1 at extended heights.

Referring again to FIG. 1, the electric chain saw 2 is shown attached at one end of the extension pole system 1. While a variety of electric chain saws 2 are applicable to the present invention, embodiments preferred lightweight devices, one example being model no. 099178H sold by DESA International located in Bowling Green, Ky., so as to minimize the moment arm when coupled to the extension pole system 1.

In some embodiments, it was further preferred to minimize the vibrational characteristics of the electric chain saw 2 during use so as to further improve control of the present invention during operation. Accordingly, the above identified electric chain saw 2 was modified so to have a chain, part number 3982-005-1640, and a guide bar, part number 3005-000-3909, sold by Stihl located in Virginia Beach, Va.

Figure 4:
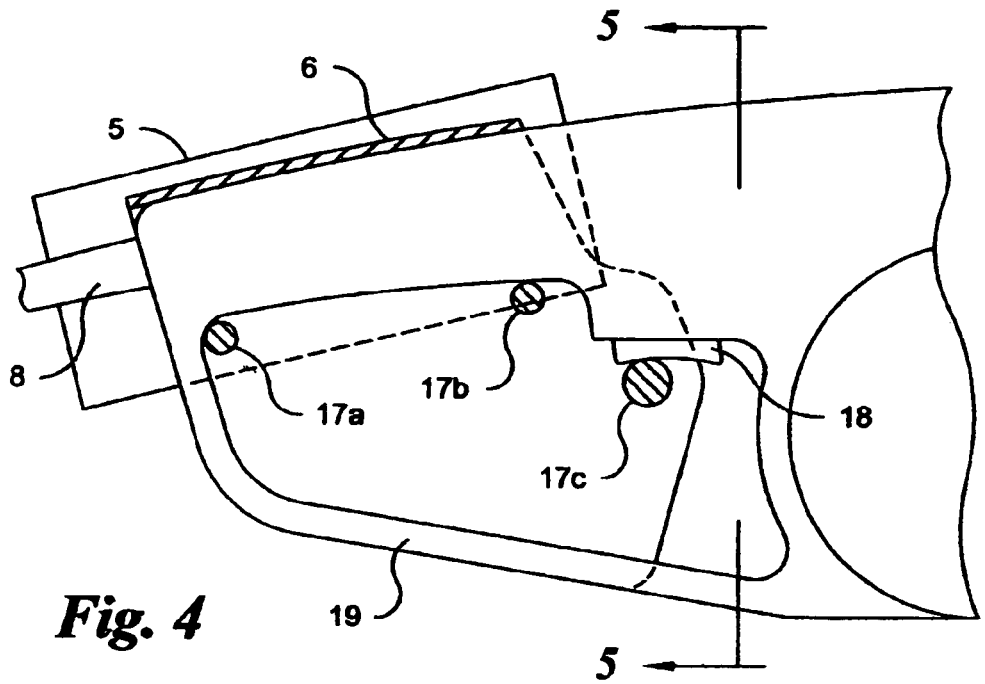
FIG. 4 is a side elevation view showing bracket attached to handgrip along the saw.
Figure 6:
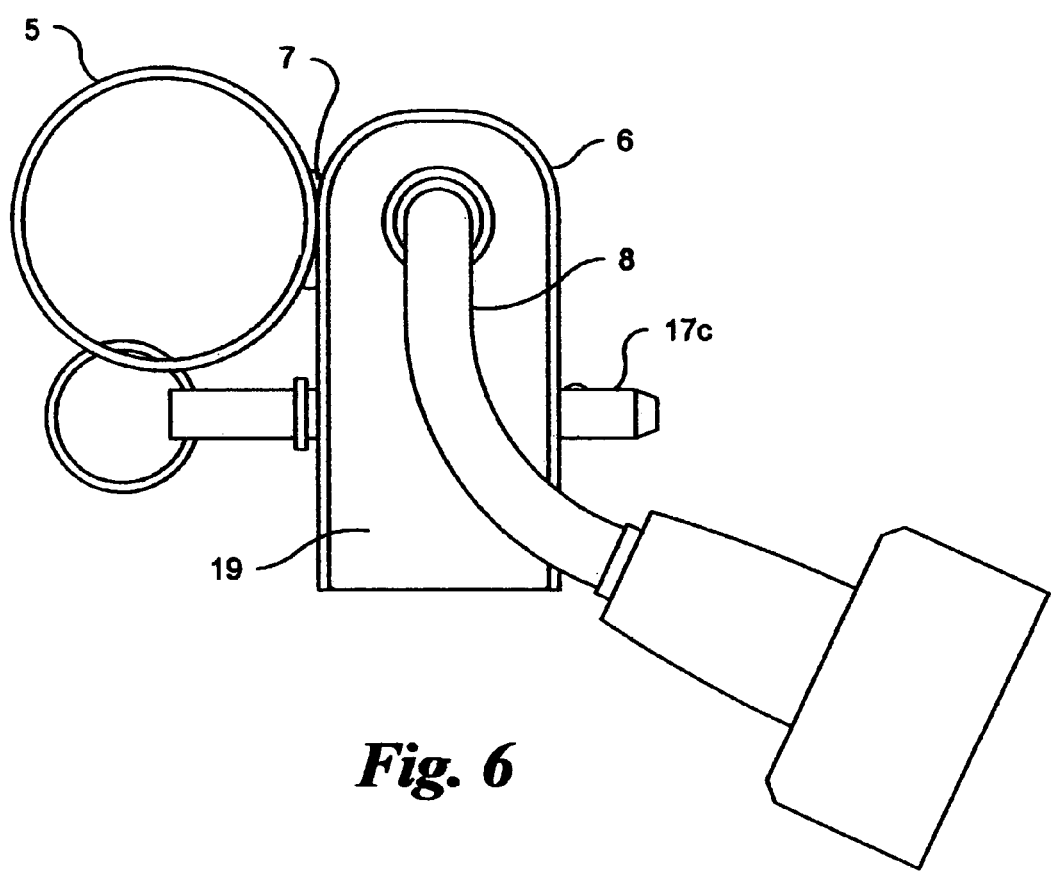
FIG. 6 is an end view of handgrip with u-shaped bracket thereabout.

Coupling between electric chain saw 2 and extension pole system 1 is achieved via a bracket 6. Referring now to FIGS. 4 and 6, the bracket 6 is a u-shaped element, preferably composed of a metal, fitting about and contacting the top of a handgrip 19 at one end of the electric chain saw 2. The bracket 6 further includes a cylindrically shaped coupler 5, also preferably composed of a metal, either welded, as represented by the weld seam 7 in FIG. 1, or mechanically fastened to the bracket 6 in a lengthwise fashion. The coupler 5 facilitates a secured yet removable attachment between bracket 6 and one pole 3b, as described above between two poles 3a, 3b. Furthermore, the coupler 5 is fixed to the bracket 6 so that the centerline 14 of the extension pole system 1 is parallel to the cutting axis 15 of the electric chain saw 2, as shown in FIG. 1.

Figure 5:
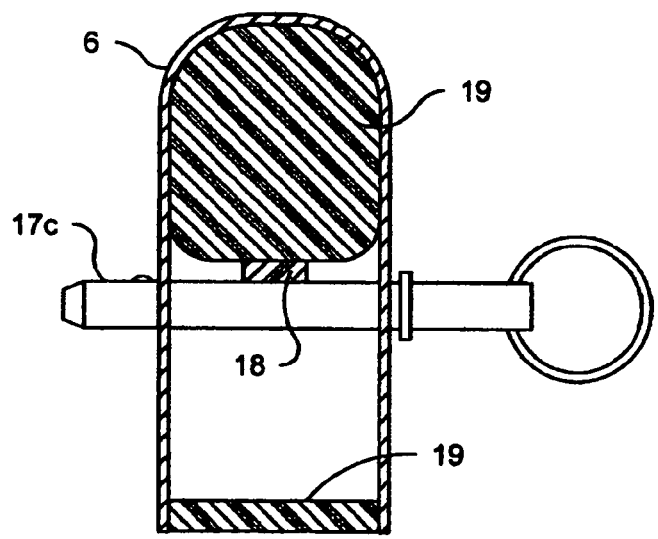
FIG. 5 is a partial section view showing u-shaped bracket about and contacting the handgrip with locking pin depressing trigger switch on chain saw.

Referring now to FIGS. 4 and 5, the bracket 6 is secured to the handgrip 19 in a removable fashion via at least three fasteners 17a–17c. Each fastener 17a–17c passes through a pair of mutually aligned holes along the bracket 6 and contacts the handgrip 19 thereby securing the bracket 6 to the electric chain saw 2. One fastener 17c depresses the trigger switch 18 of the electric chain saw 2 in the ON position. While a variety of attachment schemes are possible, the fasteners 17a–17c are arranged so that proper interlock between handgrip 19 and bracket 6 is insured when trigger switch 18 is depressed and all fasteners 17a–17c are engaged with the bracket 6.

Fasteners 17a–17c include threaded bolts and pin-type devices. For example, adequate interlock between handgrip 19 and bracket 6 was achieved with two fasteners 17a, 17b being bolts and threaded onto the handgrip 19 and a third fastener 17c being a removable pin so as to allow its removal and deactivation of the electric chain saw 2 when not in use. In other embodiments, it was preferred to have all fasteners 17a–17c being locking pins, non-limiting examples including positive lock pins, detent ring pins, detent clevis pins, and ring pins.

Referring again to FIG. 1, the wireless ON/OFF switch 11 is electrically connected to the electric chain saw 2 via an extension cord 9 and physically separated from both electric chain saw 2 and extension pole system 1. The wireless ON/OFF switch 11 may be carried by or placed on the ground near the operator 13. The wireless ON/OFF switch 11 allows the operator 13 to remotely control the function of the electric chain saw 2 via a wireless transmitter 12 carried by the operator 13. The wireless transmitter 12 communicates ON and OFF signals to the wireless ON/OFF switch 11 thereby regulating power to the electric chain saw 2. While a variety of commercially available wireless devices are applicable to the present invention, exemplary embodiments included a wireless device sold by GE Home Electric Products, Inc. of Cleveland, Ohio, model no. RF106-1D.

A tilt switch 20 is shown attached adjacent to one pole 3b along the extension pole system 1 and electrically connected between the electric chain saw 2 and the wireless ON/OFF switch 11. Tilt switch 20 communicates electrical power to the electric chain saw 2 when poles 3a, 3b are within a defined angular range of operation and interrupts power when poles 3a, 3b are oriented at an angle greater than the defined range. For example, the tilt switch 20 could allow current flow to the electric chain saw 2 when the angle between a vertical axis relative to the ground and the centerline 14 of the extension pole system 1 is less than 50-degrees and stop current flow when the angle exceeds 50-degrees.

Figure 2:
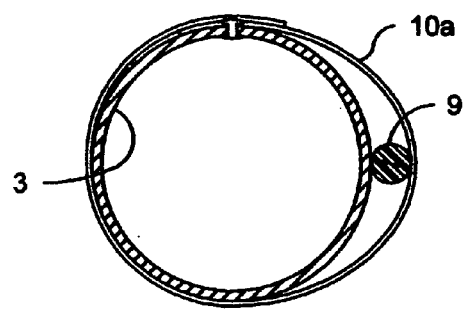
FIG. 2 is a section view of pole with extension cord attached thereto via a strap.

The tilt switch 20 is electrically connected to the electric chain saw 2 and the wireless ON/OFF switch 11 and mechanically fastened to a pole 3 via techniques under in the art. For example, one end of the tilt switch 20 may be electrically connected to the electric chain saw 2 via a power cord 8 from the electric chain saw 2 and another end of the tilt switch 20 electrically connected to an extension cord 9, an element understood in the art, which is thereafter electrically connected to the wireless ON/OFF switch 11. The extension cord 9 may be fastened to a pole 3 via a strap 10, as described in FIG. 2. One or more straps 10 may be required to securely fasten the extension cord 9 to the extension pole system 1. An exemplary strap 10 is a flexible strip-shaped piece of material having loop-type elements along one surface and hook-type elements along the other such that both elements interlock when pressed together. The tilt switch 20 may be mechanically attached to a pole 3 via screws or bolts or via an adjustable strap 10, as shown in FIG. 2 and described above.

A variety of tilt switch 20 devices are applicable to the present invention. The tilt switch 20 may be a ball actuated device, non-limiting examples include devices described by Chou in U.S. Pat. No. 6,559,396 B1 and Blair in U.S. Pat. No. 5,136,126. Alternatively, the tilt switch 20 may be a mercury contact switch, one non-limiting example being a device described by Bitko et al. in U.S. Pat. No. 3,978,301.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

What is claimed is:

1. An extended reach tree maintenance apparatus comprising:
    (a) a lightweight electric chain saw;
    (b) at least two poles, said poles hollow and stackable;
    (c) a bracket conformally fitting about a handgrip attached to said lightweight electric chain saw, said bracket having fixed along its length a cylindrically shaped coupler, said coupler facilitating secured yet removable attachment with one of said poles, said coupler fixed to said bracket so that said poles are parallel to a cutting axis of said lightweight electric chain saw;
    (d) at least three fasteners passing through said bracket and contacting said lightweight electric chain saw, said fasteners securing said bracket to said lightweight electric chain saw, one of said fasteners depressing a trigger switch on said lightweight electric chain saw; and
    (e) a wireless ON/OFF switch electrically connected to said lightweight electric chain saw so as to avoid contact with said poles, said wireless ON/OFF switch remotely operable via a wireless transmitter.

2. The extended reach tree maintenance apparatus of claim 1, wherein said poles are composed of a lightweight metal coated with a non-conductive paint having a visually distinctive color.

3. The extended reach tree maintenance apparatus of claim 2, wherein said lightweight metal is aluminum.

4. The extended reach tree maintenance apparatus of claim 1, wherein said poles are composed of a lightweight metal coated with a non-conductive polymer having a visually distinctive color.

5. The extended reach tree maintenance apparatus of claim 4, wherein said lightweight metal is aluminum.

6. The extended reach tree maintenance apparatus of claim 1, wherein said fastener depressing said trigger switch is a positive lock pin, a detent ring pin, a detent clevis pin, or a ring pin.

7. The extended reach tree maintenance apparatus of claim 1, further comprising:
    (f) a tilt switch electrically connected between said lightweight electric chain saw and said wireless ON/OFF switch, said tilt switch attached to one of said poles, said tilt switch communicating electrical power to said lightweight electric chain saw when said poles are within a defined angular range of operation and interrupting electrical power when said poles are oriented otherwise.

8. The extended reach tree maintenance apparatus of claim 7, wherein said tilt switch is a ball actuated device or a mercury contact device.

9. The extended reach tree maintenance apparatus of claim 7, wherein said poles are composed of a lightweight metal coated with a non-conductive paint having a visually distinctive color.

10. The extended reach tree maintenance apparatus of claim 9, wherein said lightweight metal is aluminum.

11. The extended reach tree maintenance apparatus of claim 7, wherein said poles are composed of a lightweight metal coated with a non-conductive polymer having a visually distinctive color.

12. The extended reach tree maintenance apparatus of claim 11, wherein said lightweight metal is aluminum.

13. The extended reach tree maintenance apparatus of claim 7, wherein said fastener depressing said trigger switch is a positive lock pin, a detent ring pin, a detent clevis pin, or a ring pin.

* * * * *

UNITED STATES PATENT AND TRADEMARK OFFICE
CERTIFICATE OF CORRECTION

PATENT NO. : 6,904,687 B1  
DATED : June 14, 2005  
INVENTOR(S) : Hill, Sr.

It is certified that error appears in the above-identified patent and that said Letters Patent is hereby corrected as shown below:

<u>Title page,</u>  
Item [57], ABSTRACT,  
Line 4, delete "sions" insert -- sion --.

<u>Column 2,</u>  
Line 31, delete "extensions" insert -- extension --.

<u>Column 5,</u>  
Line 29, delete "under" insert -- understood --.

Signed and Sealed this

Sixteenth Day of August, 2005

JON W. DUDAS  
*Director of the United States Patent and Trademark Office*